United States Patent
Jain et al.

(10) Patent No.: US 11,582,135 B2
(45) Date of Patent: Feb. 14, 2023

(54) SYSTEMS AND METHODS FOR CONSTRAINED PATH COMPUTATION IN NETWORKS WITH CONNECTIVITY AND RESOURCE AVAILABILITY RULES

(71) Applicant: Ciena Corporation, Hanover, MD (US)

(72) Inventors: Ankur Jain, Gurgaon (IN); John Wade Cherrington, Salt Spring Island (CA)

(73) Assignee: Ciena Corporation, Hanover, MD (US)

( * ) Notice: Subject to any disclaimer, the term of this patent is extended or adjusted under 35 U.S.C. 154(b) by 236 days.

(21) Appl. No.: 17/068,060

(22) Filed: Oct. 12, 2020

(65) Prior Publication Data

US 2022/0070077 A1    Mar. 3, 2022

(30) Foreign Application Priority Data

Aug. 28, 2020    (IN) .............................. 202011037113

(51) Int. Cl.
*G06F 15/16* (2006.01)
*H04L 45/02* (2022.01)

(52) U.S. Cl.
CPC .................................. *H04L 45/02* (2013.01)

(58) Field of Classification Search
CPC ....................................................... H04L 45/02
USPC .......................................... 709/200; 370/254
See application file for complete search history.

(56) References Cited

U.S. PATENT DOCUMENTS

| | | | |
|---|---|---|---|
| 6,310,883 B1 | 10/2001 | Mann et al. | |
| 7,027,388 B2 | 4/2006 | Wen et al. | |
| 7,206,281 B2 | 4/2007 | Chen et al. | |
| 7,339,889 B2 | 3/2008 | Lee et al. | |
| 7,376,086 B1 | 5/2008 | Paraschiv et al. | |
| 7,477,843 B1 | 1/2009 | Peeters et al. | |
| 7,886,080 B2 * | 2/2011 | Sajassi | H04L 12/4625 370/254 |
| 8,046,451 B2 | 10/2011 | Shah-Heydari | |

(Continued)

FOREIGN PATENT DOCUMENTS

WO    WO-2016142826 A1 *   9/2016    ............. H04L 45/12

OTHER PUBLICATIONS

Liao et al., "An efficent and accurate link latency monitoring method for low-latenct software-defined networks", IEEE Transactions and measurement, vol. 68, pp. 377-391 (Year: 2019).*

(Continued)

*Primary Examiner* — Anthony Mejia
(74) *Attorney, Agent, or Firm* — BarattaIP PLLC; Lawrence A. Baratta, Jr.

(57) ABSTRACT

Systems and methods for constrained path computation in networks with connectivity and resource availability rules build the necessary constraints directly into the routing graph so that all paths found are by construction satisfying of all the constraints. This is in contrast to the conventional approach of finding multiple paths and then applying the constraints. The present disclosure efficiently addresses the necessary constraints in the routing graph. Path Computation Engine (PCE) performance in terms of time to return acceptable paths to the user generically degrades as network scale (typically expressed through length and number of paths) increases. The present disclosure keeps the input graph small even though the graphs have expanded functionality to address constraints.

17 Claims, 10 Drawing Sheets

(56) References Cited

U.S. PATENT DOCUMENTS

| | | | |
|---|---|---|---|
| 8,310,957 B1* | 11/2012 | Rekhter | H04L 45/16 |
| | | | 370/256 |
| 8,457,001 B2 | 6/2013 | Madrahalli et al. | |
| 8,509,618 B2 | 8/2013 | Boertjes et al. | |
| 8,531,969 B2 | 9/2013 | Ong | |
| 8,559,812 B2 | 10/2013 | Oltman et al. | |
| 8,682,160 B2 | 3/2014 | Prakash et al. | |
| 8,854,955 B2 | 10/2014 | Prakash et al. | |
| 8,854,997 B2 | 10/2014 | Clow et al. | |
| 8,861,340 B1* | 10/2014 | Atlas | H04L 45/28 |
| | | | 370/227 |
| 9,054,831 B2 | 6/2015 | Prakash et al. | |
| 9,060,215 B2 | 6/2015 | Miedema | |
| 9,357,278 B2 | 5/2016 | Swinkels et al. | |
| 9,450,817 B1* | 9/2016 | Bahadur | H04L 41/0806 |
| 9,800,325 B1 | 10/2017 | Skalecki et al. | |
| 9,906,294 B2 | 2/2018 | Al Sayeed et al. | |
| 9,948,387 B2 | 4/2018 | Frankel et al. | |
| 10,033,623 B2 | 7/2018 | Jain et al. | |
| 10,097,306 B1 | 10/2018 | Chhillar et al. | |
| 10,148,578 B2 | 12/2018 | Morris et al. | |
| 10,999,195 B1* | 5/2021 | Suryanarayana | H04L 45/16 |
| 2004/0090926 A1* | 5/2004 | Hong | H04L 45/00 |
| | | | 370/254 |
| 2005/0088978 A1 | 4/2005 | Zhang et al. | |
| 2005/0265258 A1* | 12/2005 | Kodialam | H04L 45/04 |
| | | | 370/254 |
| 2006/0203747 A1 | 9/2006 | Wright et al. | |
| 2007/0025275 A1* | 2/2007 | Tallet | H04L 45/02 |
| | | | 370/255 |
| 2010/0111086 A1* | 5/2010 | Tremblay | H04L 45/507 |
| | | | 370/390 |
| 2011/0116366 A1 | 5/2011 | Smith et al. | |
| 2014/0044008 A1 | 2/2014 | Skalecki et al. | |
| 2015/0288595 A1* | 10/2015 | Suzuki | H04L 41/122 |
| | | | 370/254 |
| 2016/0037239 A1 | 2/2016 | Chhillar et al. | |
| 2016/0043797 A1 | 2/2016 | Sareen et al. | |
| 2016/0094398 A1* | 3/2016 | Choudhury | H04L 45/42 |
| | | | 370/254 |
| 2016/0182355 A1* | 6/2016 | Traxler | H04L 45/122 |
| | | | 370/359 |
| 2017/0149646 A1 | 5/2017 | Subhedar et al. | |
| 2017/0201323 A1 | 7/2017 | Prakash et al. | |
| 2017/0213089 A1* | 7/2017 | Chen | G06V 20/52 |
| 2017/0220697 A1* | 8/2017 | Wan | H04L 67/10 |
| 2017/0222912 A1* | 8/2017 | Atkinson | H04L 45/02 |
| 2018/0063608 A1 | 3/2018 | Prakash et al. | |
| 2018/0351845 A1* | 12/2018 | Horn | H04L 43/50 |

OTHER PUBLICATIONS

Baboescu et al., "A Tree based router and search engine architecture with single port memories", IEEE Proceedings of the 32nd International Symposium on Computer Architecture (ISCA '05), pp. 1-11 (Year: 2005).*

A. Felner, "Position Paper: Dijkstra's Algorithm versus Uniform Cost Search or a Case Against Dijkstra's Algorithm" Proceedings, The Fourth International Symposium on Combinatorial Search (SoCS-2011), Association for the Advancement of Artificial Intelligence, 2011, pp. 47-51.

tmforum, Frameworx Exploratory Report, "Logical Resource: Network Model Advancement and Insights," TR215, Aug. 2014, pp. 1-60.

* cited by examiner

SYSTEMS AND METHODS FOR CONSTRAINED PATH COMPUTATION IN NETWORKS WITH CONNECTIVITY AND RESOURCE AVAILABILITY RULES

FIELD OF THE DISCLOSURE

The present disclosure generally relates to networking. More particularly, the present disclosure relates to systems and methods for constrained path computation in networks with connectivity and resource availability rules.

BACKGROUND OF THE DISCLOSURE

Path computation in a network involves finding a suitable route for data between a source (ingress) and destination (egress) subject to constraints, policy, costs, weights, etc. The general approach for path computation is to use graph theory where each network node or network element is a vertex, and each link connecting the nodes are edges. With this abstraction, the path computation process becomes a graph problem. This works well in digital networks (packet, Time Division Multiplexed (TDM), etc.). A typical digital network assumes non-blocking switching functionality at a node and simple links connecting nodes, which simplifies network topology model and path computation algorithms. Photonic networks have more complicated topologies when compared to digital networks. Photonic networks, on the contrary, introduce various constraints that complicate both network topology models and path computation. In addition to wavelength blocking on photonic links and wavelength reach, an architecture of a photonic node is custom, each having unique constraints, such as size and type of digital switching fabric, the interconnection between photonic ports and drop side ports or digital fabric, the interconnection between photonic ports and photonic fabric, directionality and photonic port blocking, photonic port protection. That is, photonic networks and some digital networks have unique connectivity constraints at nodes where a simple vertex is no longer feasible for modeling a node.

Conventionally, a Path Computation Element (PCE) maintains (including updating in the face of network change) a routing graph reflecting both existing and potentially existing connectivity across the devices (nodes or network elements). This routing graph is held in memory for acceptable algorithm performance and is used directly by the various possible shortest path and other optimal topology algorithms.

In finding the optimal path of a new service, the potentially existing subgraphs of the routing graph are generated by the application of internal connectivity rules and inserted into the routing graph, typically interleaving with graph connectivity already established and available. While for some devices, this internal connectivity can be simple (e.g., every input connects to every output); in general, various constraints reflect specific device limitations. Naturally, the broader range of devices supported, the broader the variety of different constraints that need to be addressed by the PCE, hence this represents an ongoing concern for any real-world Network Management System (NMS) PCE.

A k-paths algorithm provides the shortest path between a source and destination along with a next k−1 shortest paths (which may be longer than the shortest path). Once a standard k-paths algorithm such as Yen's algorithm is in place, a weight-ranked stream of paths can be generated and in principle can be filtered against any constraint; the constraint need only be expressed as some true/false property function of the full path to be realized in this way. The key problem with a generic "post-constrained" approach based on validating paths once a k-paths algorithm fully maps them out is the number of paths needing to be generated and examined first before any constraint-satisfying paths are found can be large.

Post-processing approaches can solve general constraints defined at the level of paths, but many inadmissible paths may need to be considered before admissible paths are found, leading to poor solution times. Whereas any specific PCE specialist may arrive at a similar approach to solving problems using a pre-processing graph construction, the naïve expression of the solution multiplies out the memory and structural complexity of the routing graph and algorithms. In some cases, the amount of multiplicity can be prohibitive.

BRIEF SUMMARY OF THE DISCLOSURE

The present disclosure relates to systems and methods for constrained path computation in networks with connectivity and resource availability rules. The present disclosure solves constrained routing problems through a network of configurable devices under a variety of connectivity and resource availability rules for many day-to-day network management and planning cases. The present disclosure focuses on a strategy that builds the necessary constraints directly into the routing graph so that all paths found are by construction satisfying of all the constraints. This is in contrast to the conventional approach of finding multiple paths and then applying the constraints. Also, the present disclosure efficiently addresses the necessary constraints in the routing graph. PCE performance in terms of time to return acceptable paths to the user generically degrades as network scale (typically expressed through length and number of paths) increases. The present disclosure keeps the input graph small even though the graphs have expanded functionality to address constraints.

The present disclosure includes a method, a processing device configured to implement steps, and a non-transitory computer-readable medium having instructions stored thereon for programming a processing device to perform steps. The steps include obtaining data associated with a network, wherein the data includes a topology that describes how a plurality of network elements in the network are connected and constraint rules associated with constrained network elements of the plurality of network element that describe internal connectivity therein; defining a routing graph that includes vertices for the plurality of network elements, edges for links between the plurality of network elements, and forwarding groups as additional vertices in the routing graph where the forwarding groups encode the internal connectivity of the constrained network elements; and determining a path from a source port in a source network element to a destination port in a destination port by walking through the routing graph.

The steps can further include transforming edges associated with the additional vertices of the internal connectivity of the constrained network elements to split each of the additional vertices. The transforming can be utilized to prevent consecutive forwarding groups in a same network element. The transforming can be utilized to prevent port-to-port connectivity within a constrained network element. The transforming can be utilized to prevent traffic loops at a constrained network element for a Layer 2 service. The transforming can be performed during the walking upon arriving at the edges associated with the additional vertices.

The steps can further include splitting edges associated with the additional vertices of the internal connectivity of the constrained network elements to define must not connect rules. The steps can further include managing memory during the walking where unknown vertices not yet encountered are left out of the memory until first utilization.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for constrained path computation in networks with connectivity and resource availability rules. The present disclosure solves constrained routing problems through a network of configurable devices under a variety of connectivity and resource availability rules for many day-to-day network management and planning cases. The present disclosure focuses on a strategy that builds the necessary constraints directly into the routing graph so that all paths found are by construction satisfying of all the constraints. This is in contrast to the conventional approach of finding multiple paths and then applying the constraints. Also, the present disclosure efficiently addresses the necessary constraints in the routing graph. PCE performance in terms of time to return acceptable paths to the user generically degrades as network scale (typically expressed through length and number of paths) increases. The present disclosure keeps the input graph small even though the graphs have expanded functionality to address constraints.

Example Network

Figure 1:
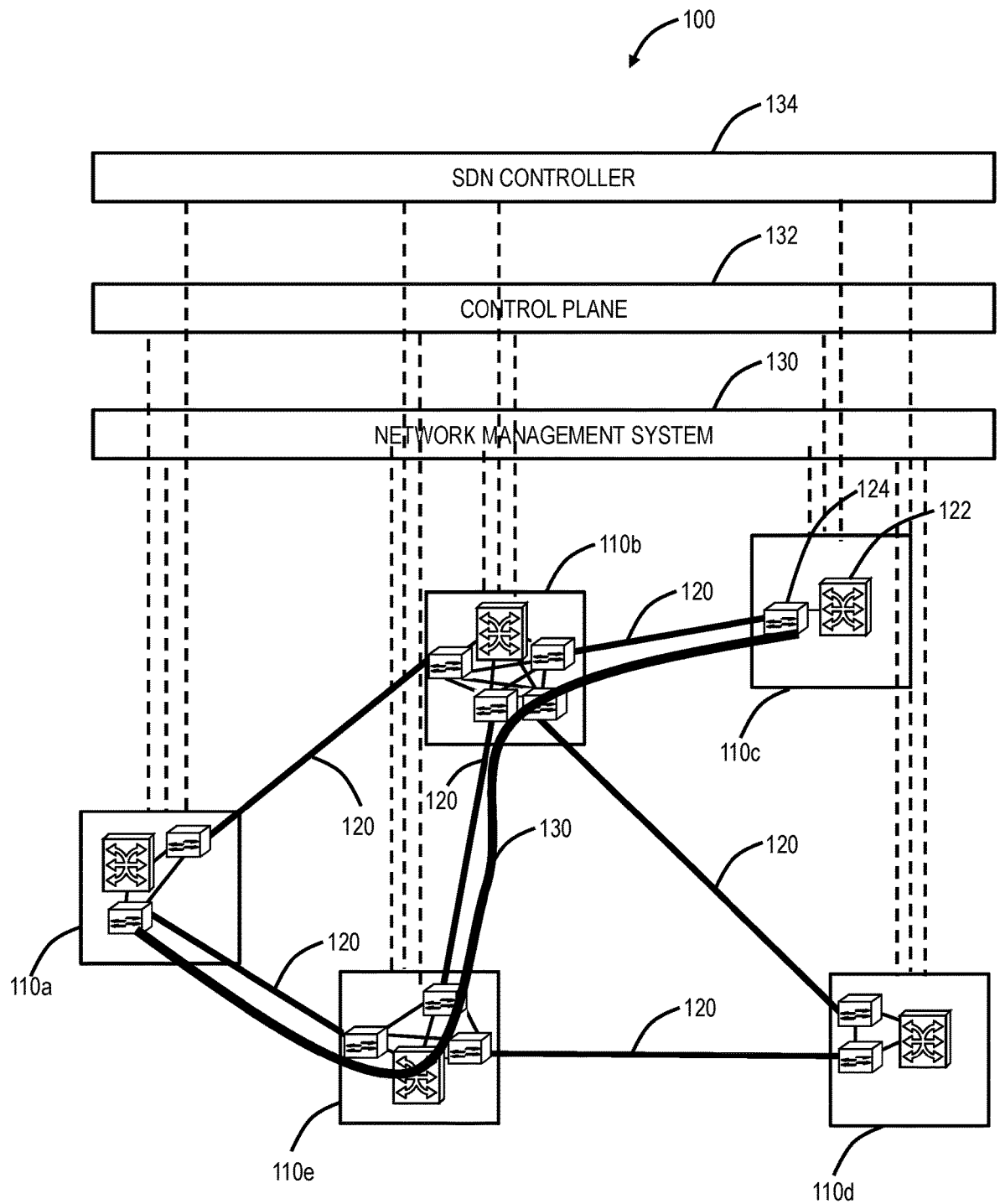
FIG. 1 is a network diagram of an example network with five interconnected sites.

FIG. 1 is a network diagram of an example network 100 with five interconnected sites 110a, 110b, 110c, 110d, 110e. The sites 110 are interconnected through a plurality of links 120. Each of the sites 110 can include a switch 122 and one or more Wavelength Division Multiplexing (WDM) network elements 124, as well as other network elements and devices omitted for simplicity. The switch 122 is configured to provide services at Layers 1 (e.g., OTN/SONET/SDH), Layer 2 (e.g., Ethernet), Layer 3 (e.g., Internet Protocol (IP), and the like as well as combinations thereof. The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those of ordinary skill in the switch 122 and the WDM network elements 124 may be realized in the same network element. The photonic layer can also include intermediate amplifiers and/or regenerators on the links 120, which are omitted for illustration purposes. The network 100 is illustrated, for example, as an interconnected mesh network, and those of ordinary skill in the art will recognize the network 100 can include other architectures, with additional sites 110 or with fewer sites, with additional network elements and hardware, etc. The network 100 is presented herein as an embodiment for implementing the constrained path computation systems and methods.

The sites 110 communicate with one another optically over the links 120. The sites 110 can be network elements which include a plurality of ingress and egress ports forming the links 120. Further, the nodes 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes at each particular node. The network 100 is illustrated with a connection 130 between the sites 110a, 110c and through the sites 110b, 110e. The connection 130 can be a Subnetwork Connection (SNC), Label Switched Path (LSP), or any other end-to-end connection that can utilize the constrained path computation systems and methods. Further, the connection 130 can include various different aspects such as a wavelength, Time Division Multiplexing (TDM) traffic, packet traffic, and a combination therein.

The preceding descriptions focus on L0/L1 aspects of the network 100. Additionally, the network 100 can include other components forming L2 and/or L3 connections in the network 100, such as routers, switches, packet-optical transport systems, and the like. That is, the network 100 can include Ethernet, Virtual Local Area Network (VLAN), Multilayer Protocol Switching (MPLS), Internet Protocol, etc. connections as well. In an embodiment, the constrained path computation systems and methods can operate at a single Layer (L0, L1, L2, or L3), and in another embodiment, the constrained path computation systems and methods can operate at multiple layers.

The network 100 can include a Network Management System (NMS) 140 that can provide an interface for Operations, Administration, Maintenance, and Provisioning (OAM&P) functions. The NMS 140 can also include a PCE. Also, the network 100 can include a control plane 150 operating on and/or between the switches 122 at the sites 110a, 110b, 110c, 110d, 110e. The control plane 150 includes software, processes, algorithms, etc. that control configurable features of the network 100, such as automating the discovery of the switches 122, the capacity of the links 120, port availability on the switches 122, connectivity between ports; dissemination of topology and bandwidth information between the switches 122; calculation and creation of paths for connections; network-level protection and restoration; and the like. In an embodiment, the control plane 150 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the network 100, and the control plane 150 can utilize any type of control plane for controlling the switches 122 and establishing connections therebetween.

A path (e.g., SNC, LSP, etc.) is considered valid for connection setup based on the availability of the switch 122, the links 120, and sufficient bandwidth available thereon, in addition to the various aspects described herein with respect to the constrained path computation systems and methods. Photonic networks, i.e., Layer 0 and the wavelength interconnectivity of the WDM network elements 124, introduce additional complexity of successfully setting up a service.

The network 100 can also include a Software-Defined Networking (SDN) controller 160. In an embodiment, the SDN controller 160, the control plane 150, and the NMS 140 can work together. In another embodiment, the SDN controller 160 can operate independently with or without the control plane 150. In a further embodiment, the SDN controller 160 may be omitted. SDN allows the management of network services through abstraction of lower-level functionality. This is done by decoupling the system that makes decisions about where traffic is sent (SDN control through the SDN controller 160) from the underlying systems that forward traffic to the selected destination (i.e., the physical equipment in the network 100). Work on SDN calls for the ability to centrally program provisioning of forwarding on the network 100 for more flexible and precise control over network resources to support new services. The SDN controller 160 is a processing device that has a global view of the network 100. Additionally, the SDN controller 160 can include or connect to SDN applications which can utilize the data from the SDN controller 160 for various purposes. In an embodiment, the SDN applications include constrained path computation systems and methods that are described in detail herein.

Specifically, the present disclosure provides constrained path computation systems and methods. Those skilled in the art will recognize these can be implemented at any of the network management system 140, the control plane 150, the SDN controller 160, as well as in-skin (locally on a network element). The preceding description utilizes the term "PCE" to denote an element associated with the network 100 for performing path computation. The PCE may be a conventional PCE element, but can also be a software module implemented at any of the management system 140, the control plane 150, the SDN controller 160, and in-skin at a network element, Path Computation The present disclosure relates to solving constrained routing problems in the network 100 under a variety of connectivity and resource availability rules. To understand the space of alternative solutions to this problem, generally, the PCE maintains (including updating in the face of network change) a routing graph reflecting both existing and potentially existing connectivity across the devices. This routing graph is held in memory for acceptable algorithm performance and is used directly by the various possible shortest path and other optimal topology algorithms. As is well-known in the art, a routing graph includes vertices (nodes) that represent network elements, e.g., the switches 122, the WDM network elements 124, etc., and edges (links) that represent connectivity between the vertices (e.g., the links 120). This modeling is convenient because once the network 100 is modeled in the routing graph, a path can be determined using various algorithms.

Note, the discussion herein centers around Dijkstra's shortest path algorithm (naturally extending to other algorithms built around Dijkstra as well) and its close variations. As this work describes the routing graph, this can be independent of Dijkstra (and closely related variations) and apply to any shortest path(s) algorithm. However, improvements described herein concerning memory management described later are specific to a Dijkstra-based approach.

In finding the optimal path of a new service, the potentially existing subgraphs of the routing graph are generated by the application of internal connectivity rules and inserted into the routing graph, typically interleaving with graph connectivity already established and available. While for some devices, this internal connectivity can be simple (e.g., every input connects to every output); in general, various constraints reflect specific device limitations. For example, a constraint may include that a specific node (edge) does not support any-to-any connectivity. Naturally, the broader range of devices supported, the broader the variety of different constraints need to be addressed by PCE; hence this represents an ongoing concern for any real-world PCE and associated constrained path computation.

The conventional approach to dealing with constraints is generating a set of paths first and then filtering the set of paths against any constraint. Here, the constraint only needs to be expressed as some true/false property function of the full path. The key problem with a generic "post-constrained" approach based on validating paths once a k-paths algorithm fully maps them out is the number of paths needing to be generated and examined first before any constraint-satisfying paths are found can be large.

In the present disclosure, there is a focus on an alternative strategy to post-path constraint approaches that build the necessary constraints directly into the routing graph so that all paths found are by construction satisfying of all the constraints. In contrast to the post-constrained approach mentioned above, this approach can be referred to as a "pre-constrained" approach.

Historically, the challenges that often arise with this approach are that:

(i) Each operative constraint, in general, needs to be translated to a routing graph through case-by-case engineering, lending an "ad-hoc" character to this approach and, in particular, complicating the code-base.

(ii) Capturing some constraints by routing graph engineering may lead to graphs with a large number of extra vertices and edges compared to the less constrained default graph.

(iii) Multiple constraints have to be enforced simultaneously. This may compound the first two points listed above, leading to code complexity and memory footprint.

For illustration, the following provides three concrete examples of internal connectivity constraints that are (a) Known to perform poorly in the post-constraint approach and (b) can be solved well by graph engineering.

What is then shown is that there is a particular pre-constraint approach that solves each problem in turn. Looking across these solutions, it was recognized that:

(i) There is a structural unity across these seemingly unrelated constraints in terms of how they can conceptualize, modeled, and implemented. This is called a functional pre-constrained pattern.

(ii) While introducing additional logical edges/vertices, there are generic strategies where the memory footprint growth can be managed in applying the functional pre-constrained pattern.

Forwarding Group

Figure 2:
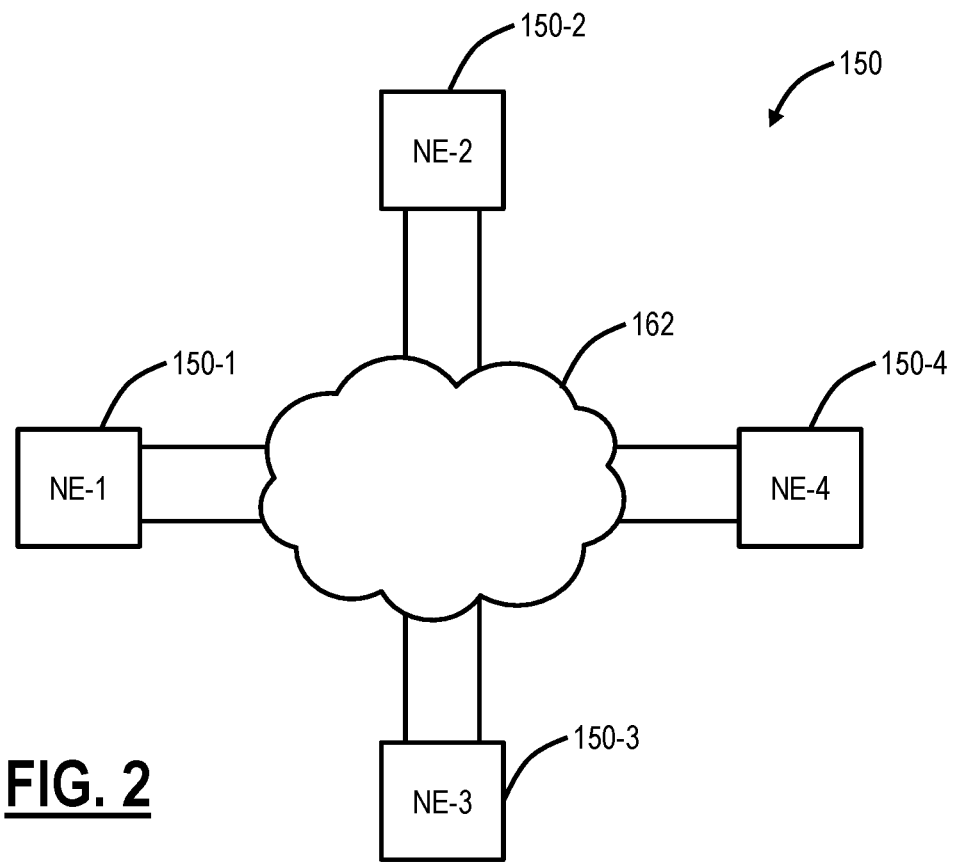
FIG. 2 is a network diagram of a network with three network elements interconnected to one another for illustrating external connectivity.
Figure 3:
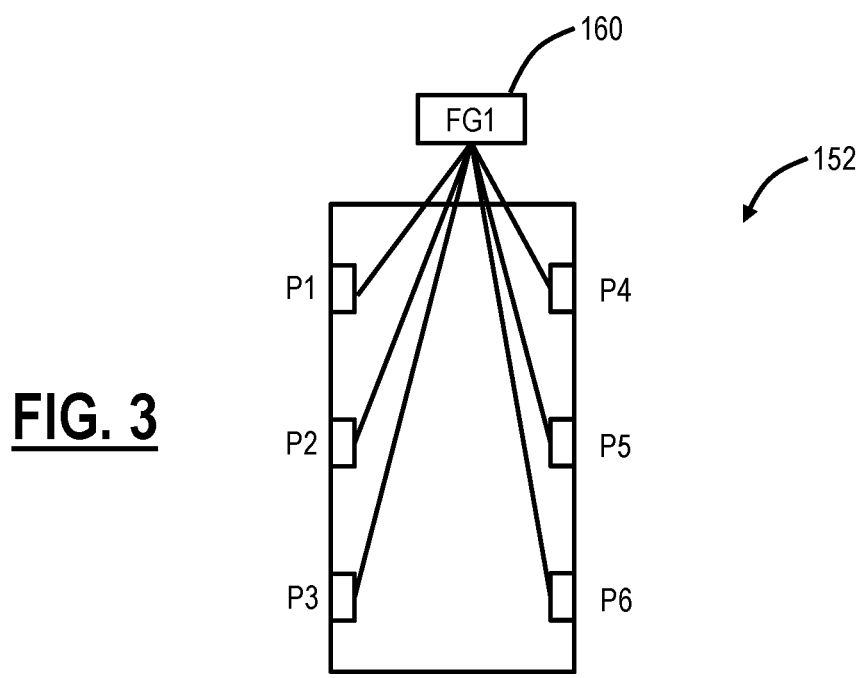
FIG. 3 is a diagram of a network element illustrating a forwarding group that is used to describe internal connectivity.

FIG. 2 is a network diagram of a network 150 with three network elements 152-1 to 152-4 interconnected to one another for illustrating external connectivity. FIG. 3 is a diagram of a network element 152 illustrating a forwarding group 160 that is used to describe internal connectivity. In the following examples, the term forwarding group 160 describes the "rule language" that a network model uses to describe internal connectivity through a network element 152. The forwarding group 160 encodes the connectivity through the network element 152, not the external connectivity depicted by a cloud 162 in FIG. 2. In FIG. 3, the forwarding group 160 is used to model the inside of a network element 152. In the example of FIG. 3, the forwarding group 160 is used to described connectivity within the network element 154 between ports P1 to P6.

For the routing graph, a port level graph is needed to model the connectivity. Two approaches can be taken:

Approach 1: Create a separate edge between each pair of ports that can connect to other ports. This would mean that there will be N*(N−1)/2 edges in the routing graph, which is a scalability concern as the number of ports on a device could be in the hundreds and apply across the network. This is impractical as the routing graph would be too large.

Approach 2: Create a separate vertex (forwarding group) in the graph and then connect each port to this vertex. This would mean the routing graph would have N edges only (N being the number of network elements 152 in the network). Considering the scale, this is the option that is used to model the telecom domain connectivity.

That is, to model internal connectivity inside a network element 152, it is not practical to make each port a vertex. Rather, the Approach 2 can enable the inclusion of the internal connectivity constraints while not significantly increasing the number of vertices and edges. The Approach 2 is also needed to avoid loops across a forwarding group 160. Otherwise, it is possible to find a path from Port P1 to Port P4 and then come in again at Port P2 and go out of Port P5.

The forwarding group 160 is introduced as the key building block to solve the internal connectivity problem. Note, in general, there can be multiple forwarding groups 160 to define different types of connectivity principles inside a network element 152.

Constraint Problems with Respect to Internal Connectivity

Now, let us turn to several specific constraint problems that arise with respect to internal connectivity using the forwarding group 160. This all proceeds from a starting point of Approach 2, which itself starts from a single forwarding group 160 virtual vertex per forwarding group rule. The following description presents four problems, labeled 1 to 4, and associated solutions.

Problem 1: Consecutive Forwarding Groups should be Avoided

Figure 4:
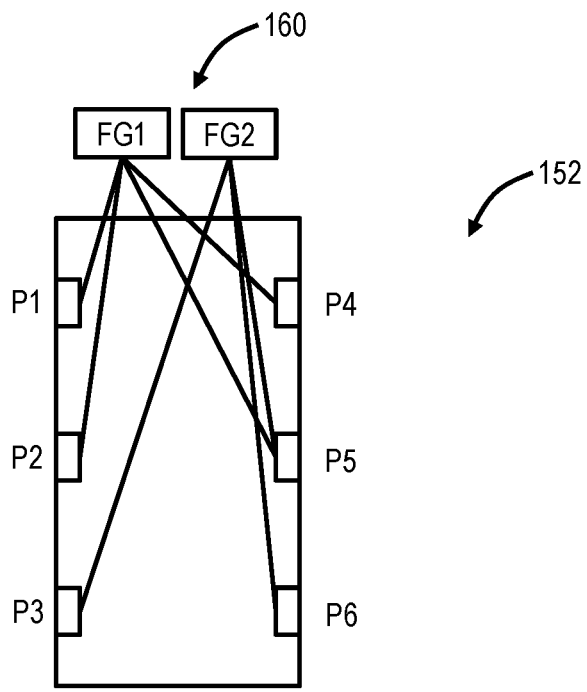
FIG. 4 is a diagram of a network element with two forwarding groups FG1, FG2.

The forwarding group declaration defines the connectivity between a union of ports and other connectivity between some other union of ports, and some ports can be common between them; this is represented in FIG. 4, which is a diagram of a network element 152 with two forwarding groups 160 FG1, FG2. In such cases, a path that goes from one forwarding group FG1 to another forwarding group FG2 is invalid and should be invalidated, in the example of FIG. 4, a path from FG-1→Port P5→FG-2 is invalid.

There are a few other cases where multiple forwarding groups are defined because the connectivity layer and rules are different between the same set of ports. One example for Optical Transport Network (OTN) is between a pair of ports; it is possible to create a cross-connect at an Optical Data Unit level k (ODUk) layer but not at an Optical Data Unit level j (ODUj) layer for a Layer 1 service. Another example includes a multi-segment pseudowire or only an ethernet virtual switch between a pair of ports for a Layer 2 service. That is, such approaches introduce different internal connectivity constraints within a network element 152, requiring two FGs.

Figure 5:
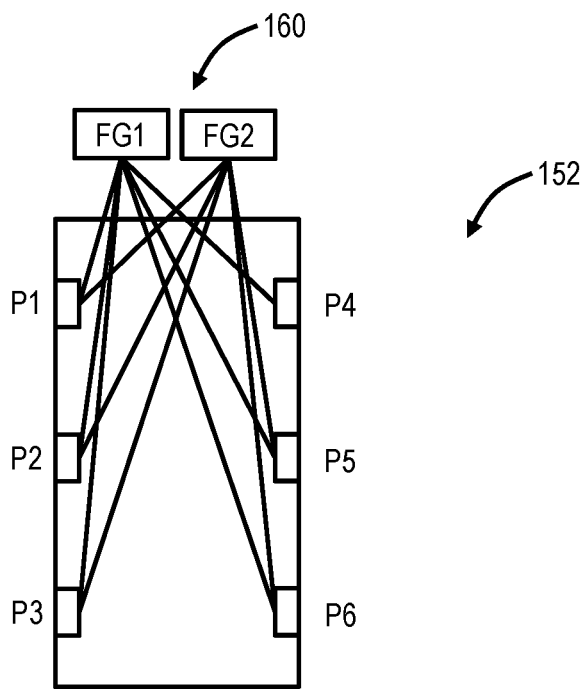
FIG. 5 is a diagram of a network element with the two forwarding groups FG1, FG2 for illustrating connectivity.

In such cases, multiple forwarding groups 160 are needed to define each layer connectivity with a constraint to prevent a loop from a layer FG to other layer FG. For example, in FIG. 5, which is a diagram of a network element 152 with the two forwarding groups 160 FG1, FG2 for illustrating connectivity, there can be an FG1 vertex and an FG2 vertex with connectivity to all ports, but it is required to invalidate consecutive edges which go from FG1→Port→FG2.

Problem 2: Ports do not have any-to-Any Connectivity

Figure 6:
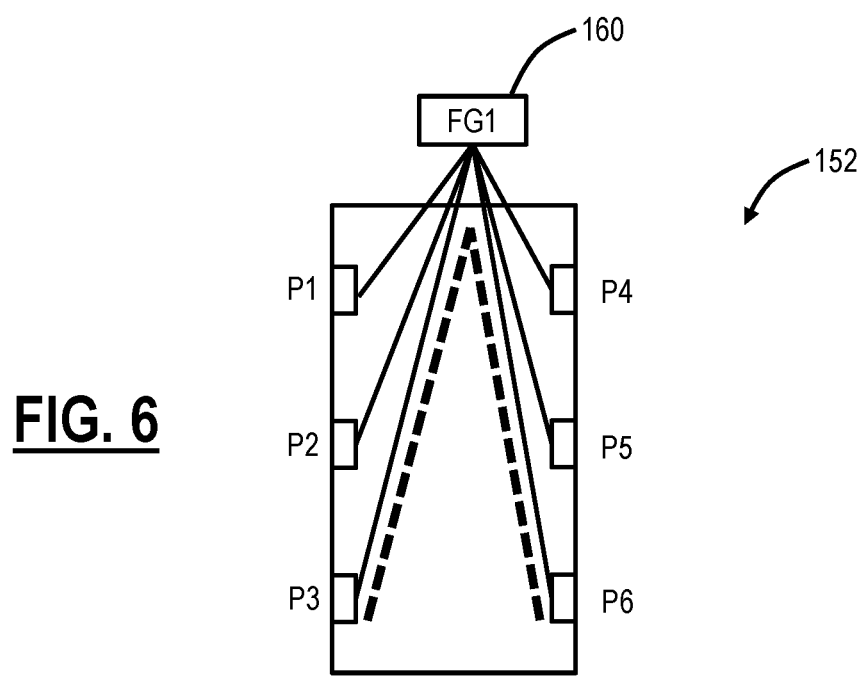
FIG. 6 is a diagram of a network element illustrating a forwarding group where the ports do not support any-to-any connectivity.

FIG. 6 is a diagram of a network element 152 illustrating a forwarding group 160 where the ports do not support any-to-any connectivity. In this example, the network element 152 has six ports P1-P6, all ports can connect to one another except port P3 cannot connect to port P6. In this case, it is difficult to solve the problem with multiple forwarding groups to define the connectivity. This is solved herein with a must-not-connect rule and algorithm described herein Problem 3: Dynamic Governance of Connectivity on Top of Static Forwarding Group Rules There are cases seen, such as in a Layer 2 service on top of G.8032 infrastructure, where generally each port of one 8032 service can connect to other 8032 services but that is invalid if two rings result in a traffic loop because of multiple points of connectivity at some other nodes in the network. This cannot be changed before computing the path, but if it is known that two rings are incompatible, the problem statement can be converted to saying that Port P1 cannot connect to Port P2 because they are part of two rings which are incompatible or form a traffic loop and it becomes a problem similar to Problem 2 described above.

Commonly Known Approaches

Computing the shortest path and k-shortest path with the above problem statements has different challenges. The Dijkstra algorithm only keeps track of the previous vertex from which it is coming from and cannot invalidate the next edge based on the previous edge. As described above, the k-shortest path algorithm can be used to compute the paths and invalidate the path in post-processing. However, this results in a lot of invalid paths being computed before getting to valid k paths; consequently, performance can deteriorate exponentially.

Solution 1: Consecutive Forwarding Group should be Avoided

Figure 7:
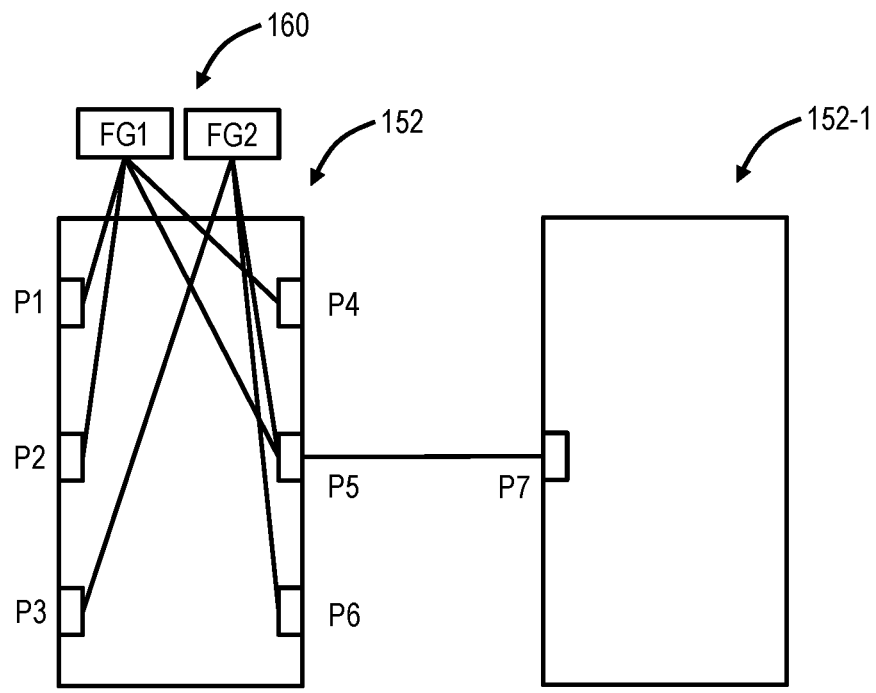
FIG. 7 is a diagram of a network element with two forwarding groups FG1, FG2 connected to another network element for illustrating a solution to consecutive forwarding groups.
Figure 8:
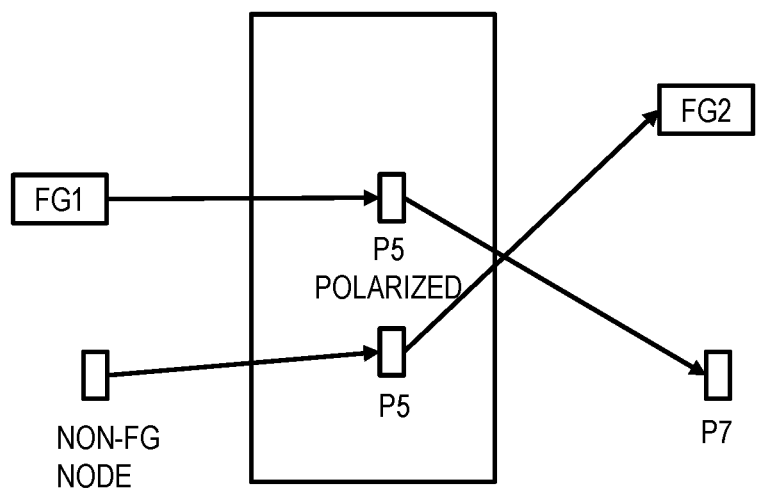
FIG. 8 is a diagram of the network element from FIG. 7 illustrating the solution to consecutive forwarding groups.

FIG. 7 is a diagram of a network element 152 with two forwarding groups 160 FG1, FG2 connected to another network element 152-1 for illustrating a solution to consecutive forwarding groups. FIG. 8 is a diagram of the network element 152 from FIG. 7 illustrating the solution to consecutive forwarding groups. In the example of FIGS. 7-8, a path from FG1→Port P5→FG2 is invalid but a path from FG1→Port P5→Port P7 is valid. The problem, in this case, is that, in a normal walk, the Dijkstra algorithm cannot stop the path from FG1→Port P5→FG2, although that is causing a loop.

To invalidate the consecutive FGs, the present disclosure defines a polarization property on a vertex so that two decisions can be taken, and two different possibilities of a path are possible. The term polarization is used to denote a vertex with this property simply has two possibilities; i.e., this does not mean polarization in the context of optical light. This is illustrated in FIG. 8 and effectively creates a two-way split of the original vertex. During a graph walk, due to the polarization property, the edges coming into Port P5 are transformed, namely, an edge coming from anywhere goes to the normal port P5 vertex, but an edge coming from an FG vertex goes to a split vertex called Polarized Port P5. Similarly, all edges going out of Port P5 are also transformed, an edge going out to an FG vertex is considered only from Vertex P5 and not from polarized Vertex P5, and an edge going out to Port P7 is considered only from polarized Vertex P5 and not from Vertex P5, as in FIG. 8.

This polarization property for a vertex enables computation of a path from FG1→Port P5→Port P7 but the inability to compute the path FG1→Port P5→FG2.

Solution 2 and 3: Must not Connect Forwarding Group

Figure 9:
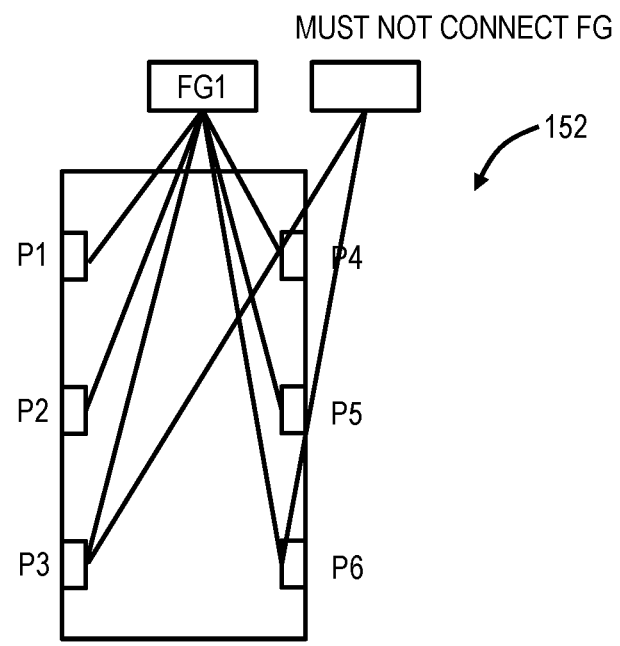
FIG. 9 is a diagram of a network element with forwarding groups FG1 for illustrating the must-not-connect rule.
Figure 10:
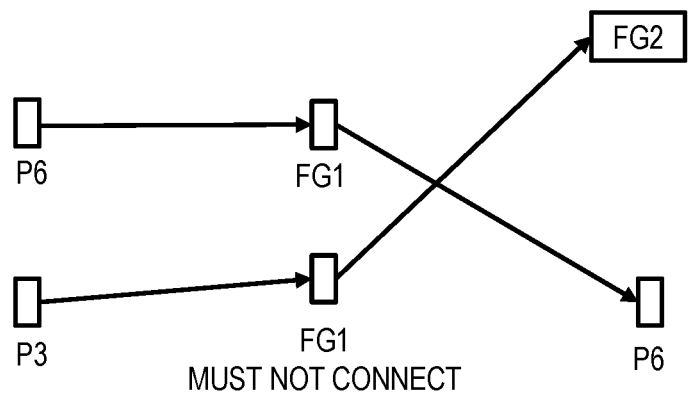
FIG. 10 is a diagram of the network element from FIG. 9 illustrating the must-not-connect rule.

FIG. 9 is a diagram of a network element 152 with a forwarding group 160 FG1 for illustrating the must-not-connect rule. FIG. 10 is a diagram of the network element 152 from FIG. 9, illustrating the must-not-connect rule. In this case and example, a path going from Port P3→FG1→Port P6 is not valid, however, a path from Port P3→FG1→Port P4 and a path from Port P2→FG1→Port P6 are valid. Just like above, the present disclosure includes checking if the source vertex has a must not connect rule defined, and, if so, the vertex is split into two (or more depending on how many must not connect rules are defined). All edges going into this vertex and going out of must not connect FG are modified using the following rule, as shown in FIG. 10.

Problem/Solution 4: Online Exclusion

A very common PCE constraint is to exclude certain nodes or edges in the routing graph. This is typically done by setting the edge weight to "infinity" (e.g., a large value that excludes the edge due to its weight) on relevant edges to realize the exclusion. Alternatively, if one thinks of a function that filters the outgoing edges that the Dijkstra algorithm retrieves during its neighborhood scan, it is possible to realize the exclusion "as we go," i.e., an online exclusion. An advantage of this approach is that only edges out of vertices that end up examined are subject to the additional overhead of a check. In standard approaches, all excluded edges trigger an action on the routing graph, whether they are used or not. In still some other standard approaches, the whole graph needs to be copied to affect these per-query custom edge weightings. All of this is avoided using the online exclusion.

General Pattern

Figure 11:
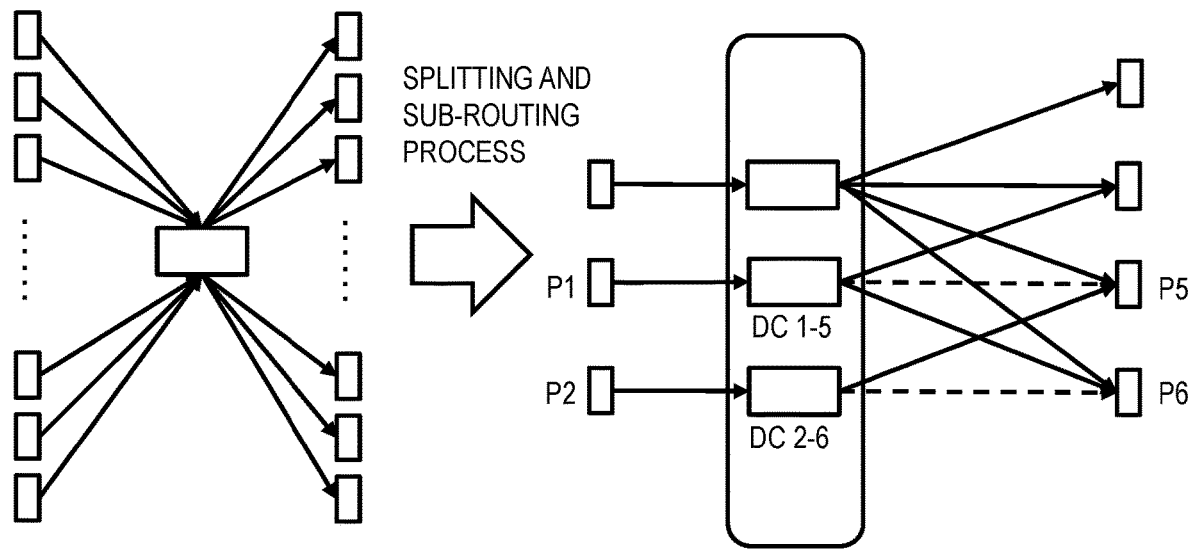
FIG. 11 is a diagram of a splitting and sub-routing process for generalizing the aspects described herein.

FIG. 11 is a diagram of a splitting and sub-routing process 180 for generalizing the aspects described herein. Starting from the original insight surrounding the use of forwarding group vertices, in non-trivial telecom networks, there are inevitably regions where potential connectivity is relatively concentrated—high valence regions. Simple modeling approaches to this connectivity start from $O(N^2)$ memory cost. Linearization of this memory footprint is possible to $O(N)$ by using virtual vertices to express the all-to-all connectivity, as discussed herein.

The common thread to the problems and solutions described herein involve the use of multiple vertices that are thought of as splitting of the original vertex into sub-vertices that receive an equivalent class of inputs, and sub-routing its outgoing connectivity into some subset of the original output ports. The solutions to all three of the Problems 1 to 3 follow this pattern. As these solutions all enforce the constraint at the level of the (transformed) routing graph, this provides a pre-constraint solution.

However, a secondary concern appears when we consider that we are now effectively re-introducing additional edges (possibly many in the general case). Indeed, if this approach were to maintain explicit edges in the routing graph, the $O(N)$ vs. $O(N^2)$ memory advantage would start to diminish. In understanding the stakes here, it is important to remember that this transform is in principle needed at every device subject to the constraints/rules, and the typical case is that most constraints relevant for a particular network layer are relatively universal across the network, i.e., every network element.

To address the re-emergence of a memory concern, the present disclosure includes a modification to the Dijkstra algorithm so that the new edges and vertices that arise from the transform have an implicit existence, but they are not explicitly allocated within the routing graph between routing calls. This is accomplished by recognizing what structure the Dijkstra algorithm expects to "see" as it seeks the shortest path:

(a) it needs to access all the outgoing neighbors of a vertex. The effective routing graph is formed as a function of the explicit in-memory graph (in terms of unsplit vertices) as the Dijkstra algorithm is run that takes this graph into a generally expanded (split vertices) graph with additional edge structure relevant for the constraints.

(b) an edge to map to a weight. This allows edges injected by the graph transform function (a) to have well-defined weights (typically related to original edge weights or determined by some specific principle related to the constraint).

Once the Dijkstra algorithm completes its shortest path search using the implicit/functionalized mapping above, it needs to walk back the potentially expanded structure to return an appropriate representation of a path to a user. This is straightforward:

(a) Any split vertices that appear in this path need to be projected back to the original.

(b) Once this is done, standard forwarding group post-processing can map the left and right-side edges at an FG vertex to a "cross-connect" like port to the port edge can be applied.

Since this framework provides the routing graph with a joint explicit-implicit expression, this is called a functional pre-constraint approach.

Memory Growth during Dijkstra Shortest Path Execution

So far, it has been shown that there are a variety of flexibilities within a functional form of the pre-constraint approach that share a common structure that can be realized in a way that is neutral to the original routing graph and in particular its memory footprint. One remaining concern is the query-time memory usage that comes into play as a modified form of the Dijkstra algorithm is running. The total peak memory overall will derive from the standing routing graph memory allocation plus a transient memory overhead per-query. Is there a risk with this strategy of conserving the first footprint, but "blowing out" the latter these additional sub-vertices and connecting edges are introduced?

To address these concerns, recall the three data structures used by the Dijkstra algorithm and its close variants. It is in these data structures that edge or vertex inflation relative to the original routing problem could potentially occur with the pre-constraint approach. These are:

| | |
|---|---|
| Q | Sorted, distance-ordered vertex queue |
| DistanceMap | Stores the distance to each vertex |
| PredecessorMap | Allows walking back from destination to source along the shortest path |

Specifically, the following pseudocode illustrates the Dijkstra algorithm with Q represented by "Q," DistanceMap represented by "dist[v]," and PredecessorMap represented by "prev[v]":

```
function Dijkstra(Graph, source):
    create vertex set Q
    for each vertex v in graph:
        dist[v] ← INFINITY
        prev[v] ← UNDEFINED
        add v to Q
    dist[source] ← 0
    while Q is not empty:
        u ← vertex in Q with min dist[u]
        remove u from Q
        for each neighbor v of u: // only v that are still in Q
            alt ← dist[u] + length(u, v)
            if alt < dist[v]:
                dist[v] ← alt
                prev[v] ← u
    return dist[ ], prev[ ]
```

The Q and DistanceMap are exposed to additional vertices and rewritten to and read from during the running of the algorithm. A key insight that comes from a variation of Dijkstra's algorithm known as the Uniform Cost Search (UCS) algorithm (see Felner, A. "Position Paper: Dijkstra's Algorithm versus Uniform Cost Search or a Case Against Dijkstra's Algorithm," Proceedings of The Fourth International Symposium on Combinatorial Search, 2011, the contents of which are incorporated by reference) is that Q divides into OPEN, CLOSED, and UNKNOWN, and the size that need be held in memory at any given time is proportional to OPEN—the vertices that are known but not completely analyzed (sometimes referred to as "frontier" set). Vertices that have been completely visited (CLOSED) can be ignored or stored to disk; vertices that have not yet been encountered (UNKNOWN) do not need to be held explicitly in memory as they will be examined based on inspecting functional transforms of the original routing graph. The DistanceMap can be partitioned similarly. This covers Q and DistanceMap concerns. That is, memory management during execution of shortest path algorithm can be based on the UCS algorithm approach with heap (memory) management where UNKNOWN vertices not yet encountered are left off the heap upon its first initialization.

The PredecessorMap is exposed to growth in edges and is written to during the main Dijkstra algorithm loop. However, it is needed only once the shortest path has been found—it is not read from until the core loop of the Dijkstra algorithm completes. As such, the edges encountered can be written to a disk-backed key-value store maintained in a separate thread with little impact on run-time performance.

To summarize, using insights on the main Q that comes out of the UCS variant of the Dijkstra algorithm, alongside some other data-structure and algorithm consideration, there is a path to having available sufficient query-time memory that can then be used to perform various expansion-like transforms into sub-vertices in the general case of the framework. This is because the maximum frontier/OPEN size of the Dijkstra algorithm as it runs will be considerably smaller than the whole network.

Canonical Form

Each internal connectivity rule can be defined by a combination of:

(i) A partition function that divides ports into classes that have the same outgoing connectivity. It is a function P→C, where C is the set of equivalence classes for a given rule.

(ii) For each class defined by the partition function, a filter function F(c in C, p in P) that defines which outgoing ports are in the scope of the partition class.

At the level of an effective routing graph, each partition member becomes an internal vertex (see FIG. 12 which is a diagram of partitioning and filtering steps for transforming the routing graph) and its effective connectivity to input ports is defined by partition function evaluation at the point where input port edge neighborhood is evaluated in Dijkstra or Dijkstra-related algorithm. Its effective outgoing edge connectivity is based on applying filter function on the set of possible output ports for the internal connectivity domain (Pour).

As per general approach described herein, the term "effective" is used to describe a situation where the structure is not necessarily pre-stored in the routing graph, rather it can be dynamically created as each input port bordering on an internal connectivity domain is encountered (assumed decorated by one or more of the rules).

Automatic Extensibility

Consider how any N rules defined in canonical form can lead to an overall extended rule (enforcing all conditions) within the generic setting. Notably, no code beyond the canonical form described above needs to be written or rewritten when a new rule is defined. Consider first the case of jointly satisfying a number of constraints. In this case, when one arrives at any input port, the dynamic internal vertices and edges are "produced" as follows:

For every operative rule 1 . . . N at that port, a product vertex including $V_1$-$V_2$- . . . -$V_N$ is introduced, formed according to each of the N partitioning functions.

The conjunction (logical AND) of filters for each rule 1 . . . N is applied to the total possible set of output edges in determining outgoing edge connectivity.

Note the above rule assumes the set of N rules at a port are in an "AND" relationship—all relevant constraints must be simultaneously satisfied. To support a general Boolean statement combining logical OR and logical AND of rules $R_i$ applicable to a given input port, one can always factor it into disjunctive normal form via standard Boolean algebra algorithms:

($R_{x1}$ AND $R_{x2}$ . . . AND $R_{xmx}$) OR ($R_{y1}$ AND $R_{y2}$ . . . AND $R_{ymy}$) OR . . .

In this case, for each bracketed island of AND, inject the effective graph structure as described above.

At the same time, for each bracketed island separated by OR, tie the same port to vertices represented by each bracketed island to provide alternative opportunities to route through the internal connectivity domain.

The present disclosure enables multiple rules to be applied simultaneously in combination. Also, multiple rules can be simultaneously applied according to automatic extensibility that allows new rules written in a canonical form to be combined with existing rules wherein code for existing rules can be kept unmodified.

EXAMPLE

Figure 12:
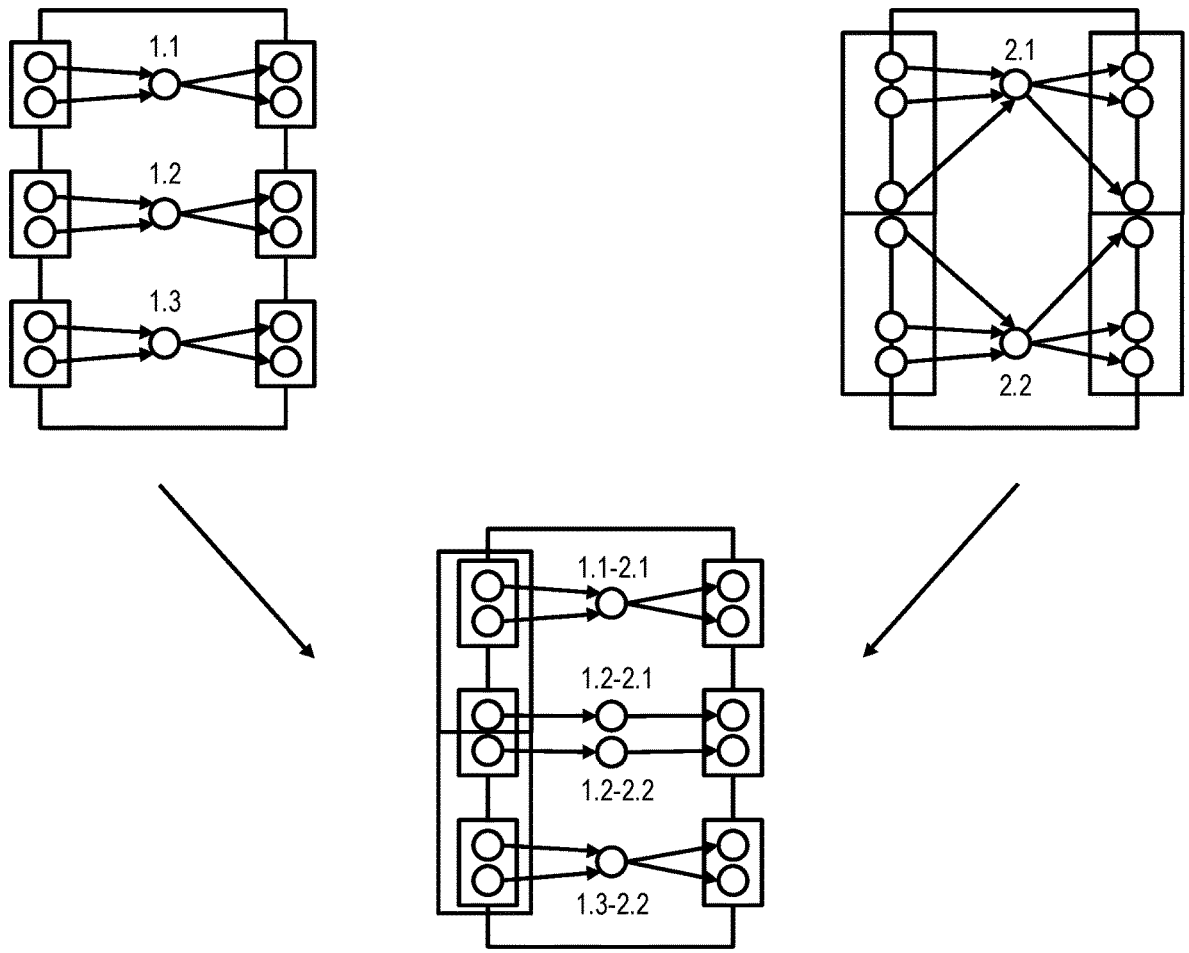
FIG. 12 is a diagram of partitioning and filtering steps for transforming the routing graph.

In FIG. 12, two fairly simple rules are presented for illustrative principles and consider the joint constraint: Give us only paths across internal connectivity domains that are consistent with both Rule 1 and Rule 2.

Rule 1 uses an input partition into consecutive pairs and asserts "any port in an input partition can connect to an output port if it is in the same pair." The concept of "same pair" is defined on the Filter Predicate $F_1(c$ in $C_1$, p in P) set.

Rule 2 says the input partition is in two sets, first three input and last three input; the rule asserts "any port in an input partition can connect to the output port in the corresponding output partition." The concept of the same partition is defined using the Filter predicate $F_2(c$ in $C_2$, p in P).

FIG. 12 shows graphically the process by which the partitioning and filtering steps are combined.

Summary

When internal connectivity rules are written in the form described herein, they become automatically combinable in the sense that the code for all existing rules does not have to be:

(a) continuously rewritten when another new rule is added.

(b) during program execution, no extraneous code nor associated memory-allocated structure beyond that needed for the particular operative rules comes into play.

An additional benefit of this extensible framework is that it is possible that by inspecting the name of the internal vertices (created by the partition function for each distinct rule) during debugging, an engineer can tell precisely what combination of declared rules enabled passage across a network element or sub-element.

The general way this connectivity aligns particularly well with network management concerns. As vendors contend with integrating both their own hardware and third-party hardware, the network management system is confronted with a diversity of internal connectivity domains representing the heterogeneous capabilities and equipment layouts. The ability to systematically define and generically combine different connectivity constraints (with minimal ongoing code impact) is particularly strategic in this setting.

Processing Device

Figure 13:
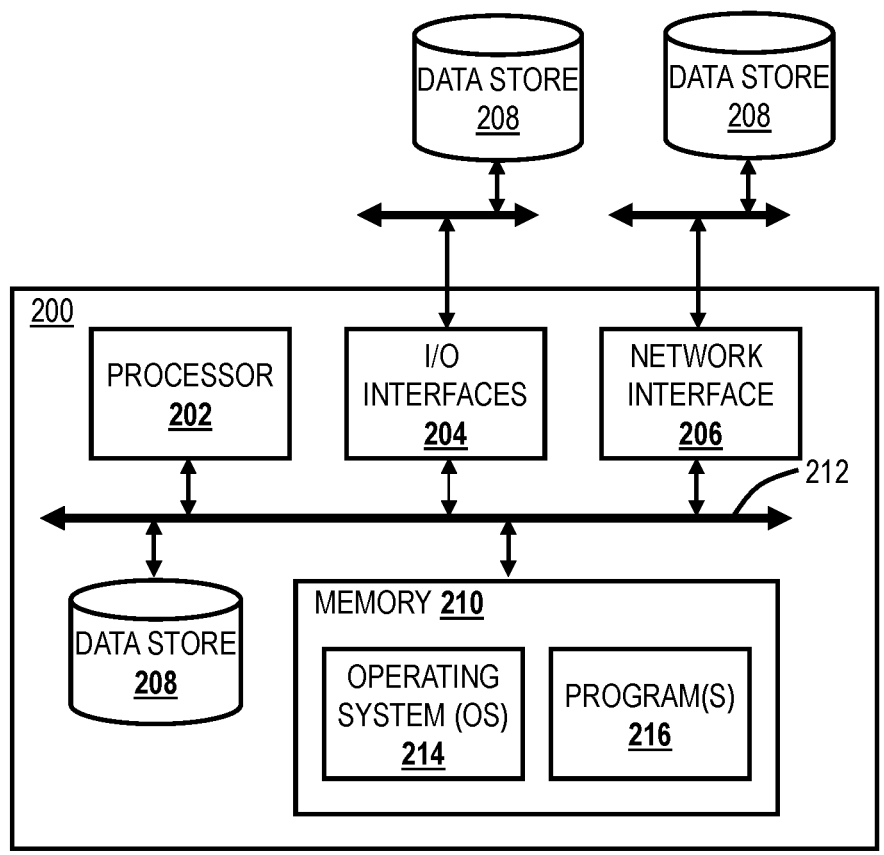
FIG. 13 is a block diagram of a processing device for use herein.

FIG. 13 is a block diagram of a processing device 200 for use herein. The processing device 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 13 depicts the processing device 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory 210, to communicate data to and from the memory 210, and to generally control operations of the processing device 200 pursuant to the software instructions. The I/O interfaces 204 may be used to receive user input from and/or for providing system output to one or more devices or components.

The network interface 206 may be used to enable the processing device 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the processing device 200, such as, for example, an internal hard drive connected to the local interface 212 in the processing device 200. Additionally, in another embodiment, the data store 208 may be located external to the processing device 200, such as, for example, an external hard drive connected to the I/O interfaces 204 (e.g., SCSI or USB connection). In a further embodiment, the data store 208 may be connected to the processing device 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Process

Figure 14:
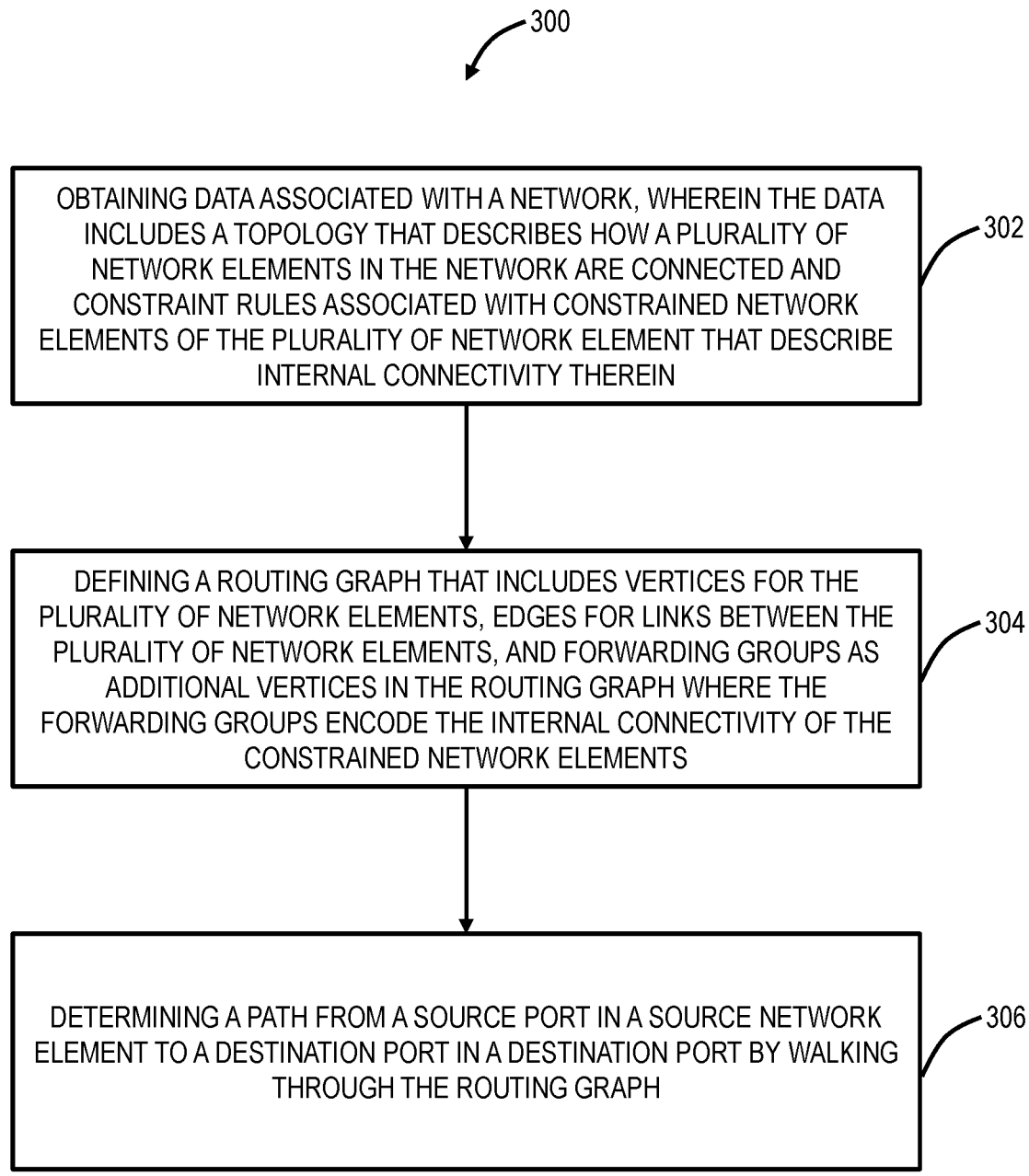
FIG. 14 is a flowchart of a constrained path computation process.

FIG. 14 is a flowchart of a constrained path computation process 300. The constrained path computation process 300 can be a method, embodied as instructions stored in a non-transitory computer-readable medium for programming a processing device to perform steps, and implemented via a processing device, e.g., a PCE, NMS, in-skin controller in a network element, etc.

The constrained path computation process 300 includes obtaining data associated with a network, wherein the data includes a topology that describes how a plurality of network elements in the network are connected and constraint rules associated with constrained network elements of the plurality of network element that describe internal connectivity therein (step 302); defining a routing graph that includes vertices for the plurality of network elements, edges for links between the plurality of network elements, and forwarding groups as additional vertices in the routing graph where the forwarding groups encode the internal connectivity of the constrained network elements (step 304); and determining a path from a source port in a source network element to a destination port in a destination port by walking through the routing graph (step 306).

The constrained path computation process 300 can include transforming edges associated with the additional vertices of the internal connectivity of the constrained network elements to split each of the additional vertices. The transforming can be utilized to prevent consecutive forwarding groups in a same network element. The transforming can be utilized to prevent port-to-port connectivity within a constrained network element. The transforming can be utilized to prevent traffic loops at a constrained network element for a Layer 2 service. The transforming can be performed during the walking upon arriving at the edges associated with the additional vertices.

The constrained path computation process 300 can include splitting edges associated with the additional vertices of the internal connectivity of the constrained network elements to define must not connect rules. The path can be for any of a Layer 0 service, a Layer 1 service, and a Layer 2 service.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a processing device to perform steps of:

obtaining data associated with a network, wherein the data includes a topology that describes how a plurality of network elements in the network are connected and constraint rules associated with constrained network elements of the plurality of network element that describe internal connectivity therein;

defining a routing graph that includes vertices for the plurality of network elements, edges for links between the plurality of network elements, and forwarding groups as additional vertices in the routing graph where the forwarding groups encode the internal connectivity of the constrained network elements;

determining a path from a source port in a source network element to a destination port in a destination port by using the routing graph; and splitting edges associated with the additional vertices of the internal connectivity of the constrained network elements to define must-not-connect rules.

2. The non-transitory computer-readable medium of claim 1, wherein the steps include transforming edges associated with the additional vertices of the internal connectivity of the constrained network elements to split each of the additional vertices.

3. The non-transitory computer-readable medium of claim 2, wherein the transforming is utilized to prevent consecutive forwarding groups in a same network element.

4. The non-transitory computer-readable medium of claim 2, wherein the transforming is utilized to prevent port-to-port connectivity within a constrained network element.

5. The non-transitory computer-readable medium of claim 2, wherein the transforming is utilized to prevent traffic loops at a constrained network element for a Layer 2 service.

6. The non-transitory computer-readable medium of claim 2, wherein the transforming is performed during the using upon arriving at the edges associated with the additional vertices.

7. The non-transitory computer-readable medium of claim 1, wherein the steps include managing memory during using where unknown vertices not yet encountered are left out of the memory until first utilization.

8. A non-transitory computer-readable medium having instructions stored thereon for programming a processing device to perform steps of:

obtaining data associated with a network, wherein the data includes a topology that describes how a plurality of network elements in the network are connected and constraint rules associated with constrained network elements of the plurality of network element that describe internal connectivity therein;

defining a routing graph that includes vertices for the plurality of network elements, edges for links between the plurality of network elements, and forwarding groups as additional vertices in the routing graph where the forwarding groups encode the internal connectivity of the constrained network elements;

determining a path from a source port in a source network element to a destination port in a destination port by using the routing graph; and managing memory during the using where unknown vertices not yet encountered are left out of the memory until first utilization.

9. The non-transitory computer-readable medium of claim 8, wherein the steps include transforming edges associated with the additional vertices of the internal connectivity of the constrained network elements to split each of the additional vertices.

10. The non-transitory computer-readable medium of claim 9, wherein the transforming is utilized to prevent consecutive forwarding groups in a same network element.

11. The non-transitory computer-readable medium of claim 9, wherein the transforming is utilized to prevent port-to-port connectivity within a constrained network element.

12. The non-transitory computer-readable medium of claim 9, wherein the transforming is utilized to prevent traffic loops at a constrained network element for a Layer 2 service.

13. The non-transitory computer-readable medium of claim 9, wherein the transforming is performed during the using upon arriving at the edges associated with the additional vertices.

14. A non-transitory computer-readable medium having instructions stored thereon for programming a processing device to perform steps of:

obtaining data associated with a network, wherein the data includes a topology that describes how a plurality of network elements in the network are connected and constraint rules associated with constrained network elements of the plurality of network element that describe internal connectivity therein;

defining a routing graph that includes vertices for the plurality of network elements, edges for links between the plurality of network elements, and forwarding groups as additional vertices in the routing graph where the forwarding groups encode the internal connectivity of the constrained network elements;

determining a path from a source port in a source network element to a destination port in a destination port by using the routing graph; and transforming edges associated with the additional vertices of the internal connectivity of the constrained network elements to split each of the additional vertices, wherein the transforming is utilized to one or more of prevent consecutive forwarding groups in a same network element, prevent port-to-port connectivity within a constrained network element, and prevent traffic loops at a constrained network element for a Layer 2 service.

15. The non-transitory computer-readable medium of claim 14, wherein the transforming is performed during the using upon arriving at the edges associated with the additional vertices.

16. The non-transitory computer-readable medium of claim 14, wherein the steps include splitting edges associated with the additional vertices of the internal connectivity of the constrained network elements to define must-not-connect rules.

17. The non-transitory computer-readable medium of claim 14, wherein the steps include managing memory during the using where unknown vertices not yet encountered are left out of the memory until first utilization.

* * * * *